US005802074A

United States Patent [19]

Hall

[11] Patent Number: 5,802,074
[45] Date of Patent: Sep. 1, 1998

[54] METHOD AND APPARATUS FOR THE NON-INVASIVE TESTING OF PRINTED CIRCUIT BOARD ASSEMBLIES

[75] Inventor: Jerald N. Hall, Scappoose, Oreg.

[73] Assignee: Intel Corporation, Santa Clara, Calif.

[21] Appl. No.: 715,857

[22] Filed: Sep. 19, 1996

[51] Int. Cl.$^6$ .................................................. H05K 1/00
[52] U.S. Cl. ............................................ 371/22.6; 364/580
[58] Field of Search ................................ 364/580, 571; 371/20, 22.6, 24, 25.1, 27.1, 27.2; 395/800, 183.06, 183.08, 183.13

[56] References Cited

U.S. PATENT DOCUMENTS

| | | | |
|---|---|---|---|
| 4,070,565 | 1/1978 | Borrelli | 371/22 |
| 4,178,542 | 12/1979 | McCarthy | 324/546 |
| 4,196,386 | 4/1980 | Phelps | 371/22.6 |
| 4,212,075 | 7/1980 | Cleversey et al. | 364/580 |
| 4,261,041 | 4/1981 | Starr | 364/571 |
| 4,459,693 | 7/1984 | Prang et al. | 371/22.6 |
| 4,656,632 | 4/1987 | Jackson | 371/20 |
| 5,161,102 | 11/1992 | Griffin et al. | 395/800.01 |
| 5,243,274 | 9/1993 | Kelsey et al. | 371/22.1 |
| 5,250,908 | 10/1993 | Liu et al. | 324/542 |
| 5,276,832 | 1/1994 | Holman, Jr. | 711/3 |
| 5,287,531 | 2/1994 | Rogers, Jr. et al. | 395/289 |
| 5,297,101 | 3/1994 | Tada et al. | 365/185.21 |
| 5,440,181 | 8/1995 | Gruender, Jr. et al. | 307/156 |
| 5,563,526 | 10/1996 | Hastings et al. | 326/37 |
| 5,600,788 | 2/1997 | Lofgren et al. | 395/183.07 |
| 5,680,407 | 10/1997 | De Jong . | |

*Primary Examiner*—Emanuel Todd Voeltz
*Assistant Examiner*—Matthew Smithers
*Attorney, Agent, or Firm*—Blakely, Sokoloff, Taylor & Zafman

[57] ABSTRACT

A method and apparatus for the non-invasive testing of printed circuit board assemblies is described herein. In a first embodiment, an apparatus for testing circuit board assemblies includes a plurality of configuration selectors, a first plurality of ports, a first plurality of traces corresponding to the plurality of configuration selectors and coupled between the configuration selectors and the ports, and a second plurality of traces coupled to the first plurality of traces. In operation, the first plurality of ports place electrical signals of a first state on the first plurality of traces at a first time, and a second state at a second time. While each of the electrical signals are applied to the configuration selector via the first plurality of traces, the second plurality of traces receives associated output from the corresponding plurality of configuration selectors at the first time and the second time, wherein misconfigured or malfunctioning ones of the plurality of configuration selectors are identified.

30 Claims, 5 Drawing Sheets

METHOD AND APPARATUS FOR THE NON-INVASIVE TESTING OF PRINTED CIRCUIT BOARD ASSEMBLIES

BACKGROUND OF THE INVENTION

1. Field of the Invention

The present invention relates to the field of computer systems and, in particular, to a method and apparatus for the non-invasive testing of printed circuit board assemblies.

2. Background Information

Recognizing that "one size does not fit all", many computer system manufacturers offer a tremendous variety of computer systems for all markets and budgets. While convenient for consumers, such variety can prove cumbersome to the manufacturer in terms of the quality and productivity of their manufacturing processes.

In an effort to improve efficiency and quality, many manufacturers have determined that it is more cost effective to settle on a few printed circuit board assembly "platforms". These platforms are essentially the same, or very similar, printed circuit boards which are populated with similar components, wherein the operating configuration of a particular variety of board is selectively determined with configuration selectors. Jumper blocks, dual inline package (DIP) switches, doublepole single-throw (DPST) switches are but a few examples of configuration selectors.

While the "platformed" approach has indeed increased the efficiency of the printed circuit board manufacturing process, it has not resolved all of the quality problems. Standard visual inspection, or bed-of-nails test methods are not 100% effective. Consequently, product continues to ship wherein jumpers are misplaced, or not placed at all, and with defective or misconfigured switches. In the instance where a jumper is not placed on a jumper block, or a switch is defective, the configuration selector is left "floating". That is, the configuration selector is not tied to any particular state. This is an undesirable situation because a floating configuration selector acts as an antenna, introducing uncontrollable noise into the printed circuit board, which may adversely affect system performance. Additionally, a floating configuration selector may also be affected by environmental influences which may randomly change the state of the configuration selector. Therefore, while a printed circuit board may pass all functional tests, if a configuration selector is floating, it is an unstable system that is more likely to fail in the field.

One reason that this problem exists is the difficulty in developing an automated test environment (ATE) capable of detecting a floating configuration selector suitable for both the manufacturing and field environments. Although difficult to design a completely accurate test for manufacturing purposes, the problem is compounded once the system leaves the manufacturer where, in order to verify the integrity of a configuration selector, a technician will likely need to remove the cover of the computer to gain access to the printed circuit board assembly.

Thus a need exists for a method and apparatus for the non-invasive testing of printed circuit board assemblies suitable for both the manufacturing and field environment.

SUMMARY OF THE INVENTION

In accordance with the teachings of the present invention, an apparatus for testing circuit board assemblies includes a plurality of configuration selectors, a first plurality of ports consisting of at least one port, a first plurality of traces corresponding to the plurality of configuration selectors and coupled between the configuration selectors and the ports, and a second plurality of traces coupled to the first plurality of traces. In operation, the first plurality of ports place electrical signals of a first state on the first plurality of traces at a first time, and a second state at a second time. While each of the electrical signals are applied to the configuration selector via the first plurality of traces, the second plurality of traces receives associated output from the corresponding plurality of configuration selectors at the first time and the second time, wherein misconfigured or malfunctioning ones of the plurality of configuration selectors are identified.

In accordance with but one embodiment of the present invention, the system determines not only whether a configuration selector is functional and tied to a particular state, but also whether it is appropriately configured. As described above, a functional configuration selector, "strapped" to the appropriate state will preferably provide a constant associated output. The system injects a series of weak, noninvasive signals to each of a plurality of configuration selectors and subsequently samples the associated output of each of the configuration selectors. If the associated output of a configuration selector from the plurality of configuration selectors is substantially equal to the signals injected, the claimed invention determines that the particular configuration selector is floating, or malfunctioning and alerts the system to such fact. Alternatively, if the associated output for a particular configuration selector remains constant, the system concludes that the configuration selector is strapped to a particular operating state (e.g., Vcc or ground) and references system configuration information to verify that the determined operating configuration is accurate.

In an alternate embodiment, the number of ports may be reduced by using reconfigurable ports which, effectively, double as input and output ports. That is to say, at a first time they may act as an output port, placing a signal on the first plurality of traces coupled to the configuration selectors, while at a second time, the port is reconfigured to act as an input, sampling the associated output of a configuration selector while a second port of the plurality of ports is placing a signal on the plurality of traces.

BRIEF DESCRIPTION OF THE DRAWINGS

The present invention will be described by way of exemplary embodiments, but not limitations, illustrated in the accompanying drawings in which like references denote similar elements, and in which.

Figure 3:
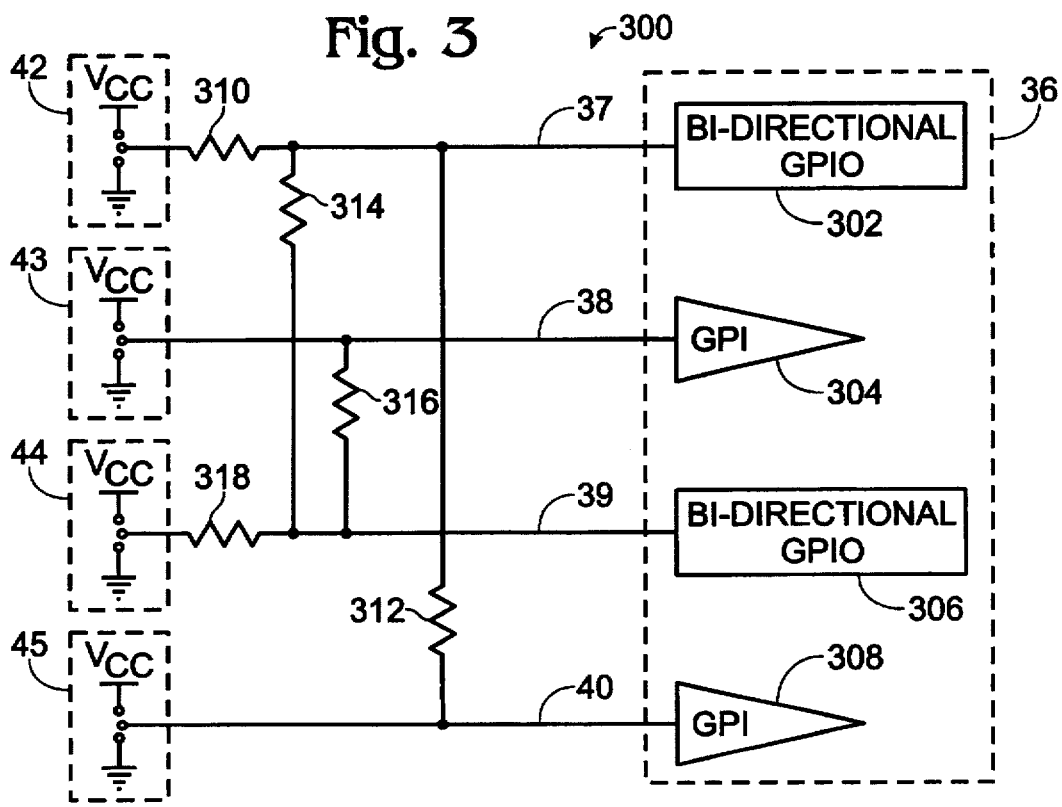
FIG. 3 illustrates, in circuit diagram form, an alternate embodiment of a circuit for determining the integrity and operating configuration of a printed circuit board assembly, suitable for incorporation in the exemplary computer system of FIG. 1.

3 configuration of a printed circuit board assembly in accordance with the teachings of the present invention and suitable for use with the circuit diagram of FIG. 3.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention. Furthermore, for ease of understanding, certain method steps are delineated as separate steps, however, these separately delineated steps should not be construed as necessarily order dependent in their performance.

Figure 1:
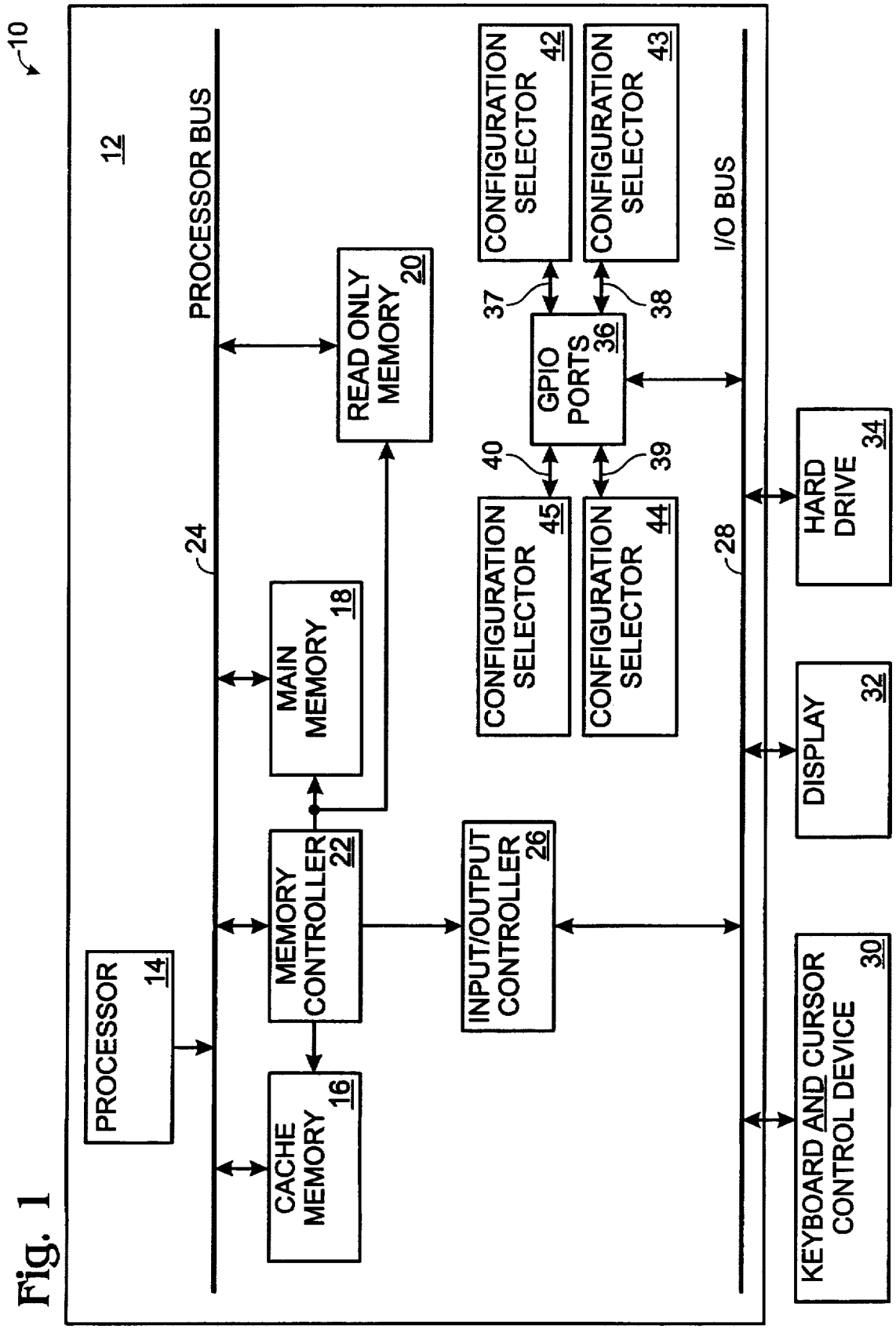
FIG. 1 illustrates a block diagram for an exemplary computer system incorporating the teachings of the present invention.

Referring now to FIG. 1, a block diagram illustrating an exemplary computer system 10 incorporating the teachings of the present invention is shown. Exemplary computer system 10 includes processor 14, cache memory 16, main memory 18, read-only memory 20, memory controller 22, and processor bus 24 coupled to each other as depicted. Read-only memory 20 includes a system basic input/output operating system (BIOS) (not shown) having start-up processes which, in one embodiment, determine the operating configuration of the computer system 10 using a method and apparatus as further described in FIGS. 2-5. Additionally, computer system 10 includes an input and output (I/O) controller 26, a general purpose input and output (GPIO) device 36, a plurality of configuration selectors 42, 43, 44, and 45, an I/O bus 28, keyboard and cursor control device 30, display 32, and hard drive 34 coupled to each other and the above enumerated elements as depicted. As depicted, elements 14-28 and 36-43 are disposed on a printed circuit board (e.g., motherboard) 12.

In addition to the system BIOS, read-only memory 20 may also store system configuration information (not illustrated). The system configuration information is a summary listing of the operating configuration information of exemplary computer system 10. In particular, the system configuration information may contain such information as processor speed, grade and access time for the main memory 18, and information relating to the desired settings for the plurality of configuration selectors 42-45. However, the system configuration information need not be stored in read-only memory 20, but may be available in any other memory storage device. Except for determining the integrity and operating configuration of configuration selectors 42-45, elements 12-36 perform their respective conventional function as known in the art, and may be implemented in any of a number of conventional techniques known to those skilled in the art. In fact, exemplary computer system 10 is intended to represent a broad category of computer systems.

The innovation of verifying the integrity and operating configuration of exemplary computer system 10 is best described with reference to the alternate embodiments illustrated in FIGS. 2-5.

Figure 2:
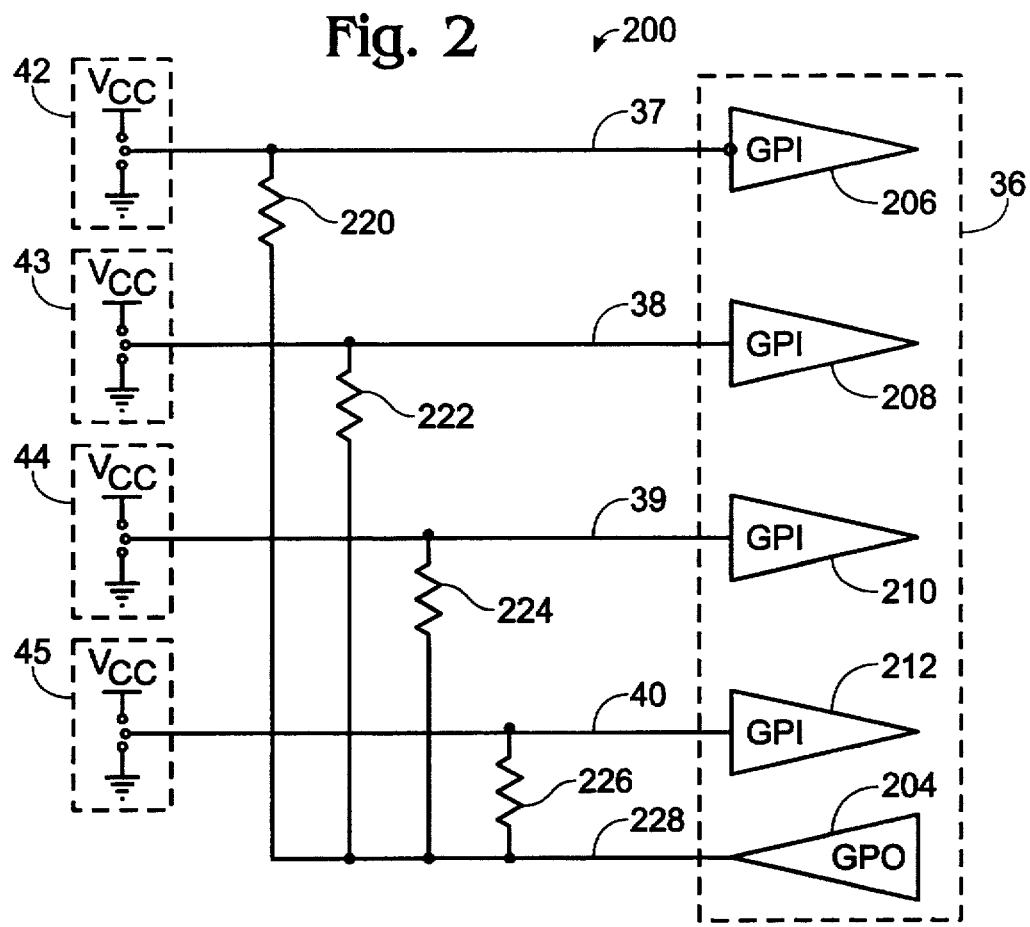
FIG. 2 illustrates, in circuit diagram form, an embodiment of a circuit for determining the integrity and operating configuration of a printed circuit board assembly, suitable for incorporation in the exemplary computer system of FIG. 1.

FIG. 2 illustrates, in circuit diagram form, a circuit for verifying the integrity and the operating configuration of a configuration selector, suitable for incorporation in exemplary computer system 10 of FIG. 1. As depicted, circuit 200 includes configuration selectors 42, 43, 44, and 45, a general purpose input and output (GPIO) device 36 having a general purpose output 204 and a plurality of general purpose inputs 206, 208, 210 and 212 corresponding to the plurality of

4 configuration selectors 42, 43, 44, and 45, and limiting resistors 220, 222, 224, 226, configured as illustrated. In the preferred embodiment, the GPIO device 36 is a National Semiconductor Super I/O™ Enhanced Sidewinder Lite, part number PC87307VUL/PC87308VUL commonly available from National Semiconductor in Sunnyvale, Calif.

As depicted general purpose output 204 of GPIO device 36 is coupled to each of the configuration selectors 42, 43, 44, and 45 with trace 228 via limiting resistors 220, 222, 224, and 226 coupled to traces 37, 38, 39, and 40 respectively. In addition, configuration selectors 42, 43, 44, and 45 are also coupled to the plurality of general purpose inputs 206, 208, 210, and 212 of GPIO device 36 via traces 37, 38, 39, and 40 as illustrated.

Figure 4:
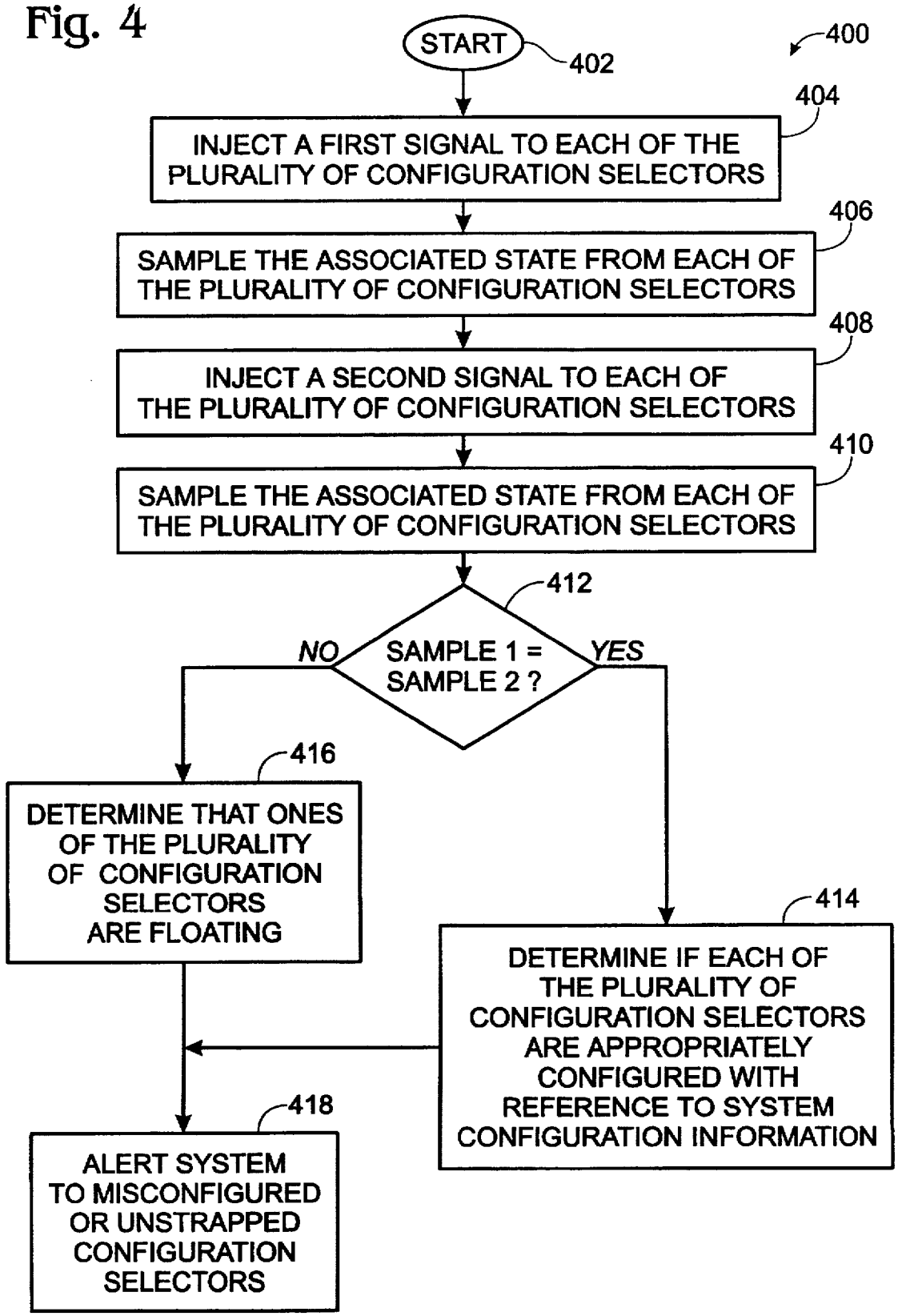
FIG. 4 illustrates, in the form of a flow chart, a method for determining the integrity and operating configuration of a printed circuit board assembly, in accordance with the teachings of the present invention and suitable for use with the circuit diagram of FIG. 2.

The operation of circuit 200 will be illustrated with continued reference to FIG. 2 and further reference to FIG. 4. The system begins, in step 402 with a request to verify the integrity and operating state of a configuration selector 42-45 received by GPIO device 36. General purpose output 204 places a first signal of a first state on trace 228 through limiting resistors 220, 222, 224, 226 to traces 37, 38, 39, 40 which are coupled to configuration selectors 42, 43, 44, and 45, respectively, in step 404. In step 406, with the first signal still applied, GPIO device 36 samples the associated output of each of the configuration selectors 42, 43, 44, and 45 received on traces 37, 38, 39, and 40 with general purpose inputs 206, 208, 210, and 212. Subsequently, a second signal of a second state is placed on trace 228 by general purpose output 204 through limiting resistors 220, 222, 224 and 226 to traces 37, 38, 39, and 40 coupled to configuration selectors 42, 43, 44 and 45 in step 408. In step 410, GPIO device 36 samples the associated output of each of the configuration selectors 42, 43, 44 and 45 received on traces 37, 38, 39 and 40 with general purpose inputs 206, 208, 210 and 212. The associated output sampled from each of the configuration selectors 42-45 at the first time is compared with the associated output sampled from each of the configuration selectors 42-45 at the second time in step 412. If the associated output of each of the configuration selectors 42-45 sampled at the first time is not substantially equivalent to the associated output of each of the configuration selectors 42-45 sampled at the second time, the apparatus determines that a corresponding configuration selector of the plurality of configuration selectors 42-45 is floating (i.e., not tied to a particular state), in step 416. Alternatively, in step 414, wherein the associated output sampled at the first time and the second time are substantially equivalent, the apparatus concludes that the corresponding configuration selector 42-45 is functional. For each functional configuration selector of the plurality of configuration selectors, the apparatus verifies, in step 414, that the configuration selector 42-45 is appropriately configured by comparing the sampled associated output with system configuration information (not shown).

The electric signals injected to the plurality of configuration selectors 42-45 via output port 204 are preferably weak, non-invasive signals achieved through the use of limiting resistors 220, 222, 224, 226. Limiting resistors 220, 222, 224 and 226 are sized to limit the current of the signal injected from port 204. For purposes of this discussion, the definition of a weak, non-invasive signal is a current-limited signal that does not change the state of a properly configured, functional configuration selector. That is, if a particular configuration selector is being used in an application on a motherboard which requires the configuration selector to deliver 3.3 V, then the injected logic signal will be tempered by an appropriate limiting resistor, or series of limiting resistors, to not drive the state of the configuration selector output to a different value. Similarly, if the configuration selector is tied to ground in a particular application, the introduction of the weak, non-invasive signal will not change the state of the configuration selector output. By incorporating the use of a weak, non-invasive signal, the apparatus described may be incorporated into a number of embodiments wherein the integrity and operating configuration of a configuration selector may be tested while the computer is otherwise in use (e.g., a third-party software "utility").

Turning to FIG. 3, a circuit diagram for an alternate embodiment of an apparatus for verifying the integrity and operating configuration of a printed circuit board assembly, suitable for incorporation in the exemplary computer system of FIG. 1 is illustrated. Circuit 300 includes a GPIO device 36 having reconfigurable general purpose input and output (GPIO) ports 302 and 306, general purpose input ports 304 and 308, limiting resistors 310, 312, 314, 316 and 318 and configuration selectors 42, 43, 44, and 45 coupled as shown. The reconfigurable GPIO ports 302 and 306 of GPIO device 36 are designed such that they may be selectively configured as an output or an input. More particularly, they may be configured as a general purpose output port at a first time and, as required in the application, reconfigured as a general purpose input port at a second time. The benefit of this added flexibility will become apparent as described in the context of the novel application below.

With continued reference to FIG. 3, reconfigurable GPIO port 302 is coupled to configuration selector 42 through limiting resistor 310. In addition, reconfigurable GPIO port 302 is also coupled to configuration selector 43 through limiting resistors 314 and 316, configuration selector 44 through limiting resistors 314 and 318, as well as configuration selector 45 through limiting resistor 312. General purpose input port 304 is coupled to configuration selector 43. Reconfigurable GPIO port 306 is coupled to configuration selector 44 through limiting resistor 318, to configuration selector 42 through limiting resistors 314 and 310, and to configuration selector 43 through limiting resistor 316. Finally, general purpose input port 308 is coupled to configuration selector 45.

A distinguishing feature of FIG. 3 is that with the addition of a single limiting resistor and incorporating the flexibility of reconfigurable GPIO ports 302 and 306, the circuit of FIG. 3 requires one less GPIO port than the circuit of FIG. 2, a costly commodity for many designers. Also, as in FIG. 2, limiting resistors 310, 312, 314, 316, and 318 are sized to ensure that the electrical signal injected into configuration nodes 42–45, are weak, non-invasive signals that will not change the state of a properly configured and functional configuration selector.

Figure 5:
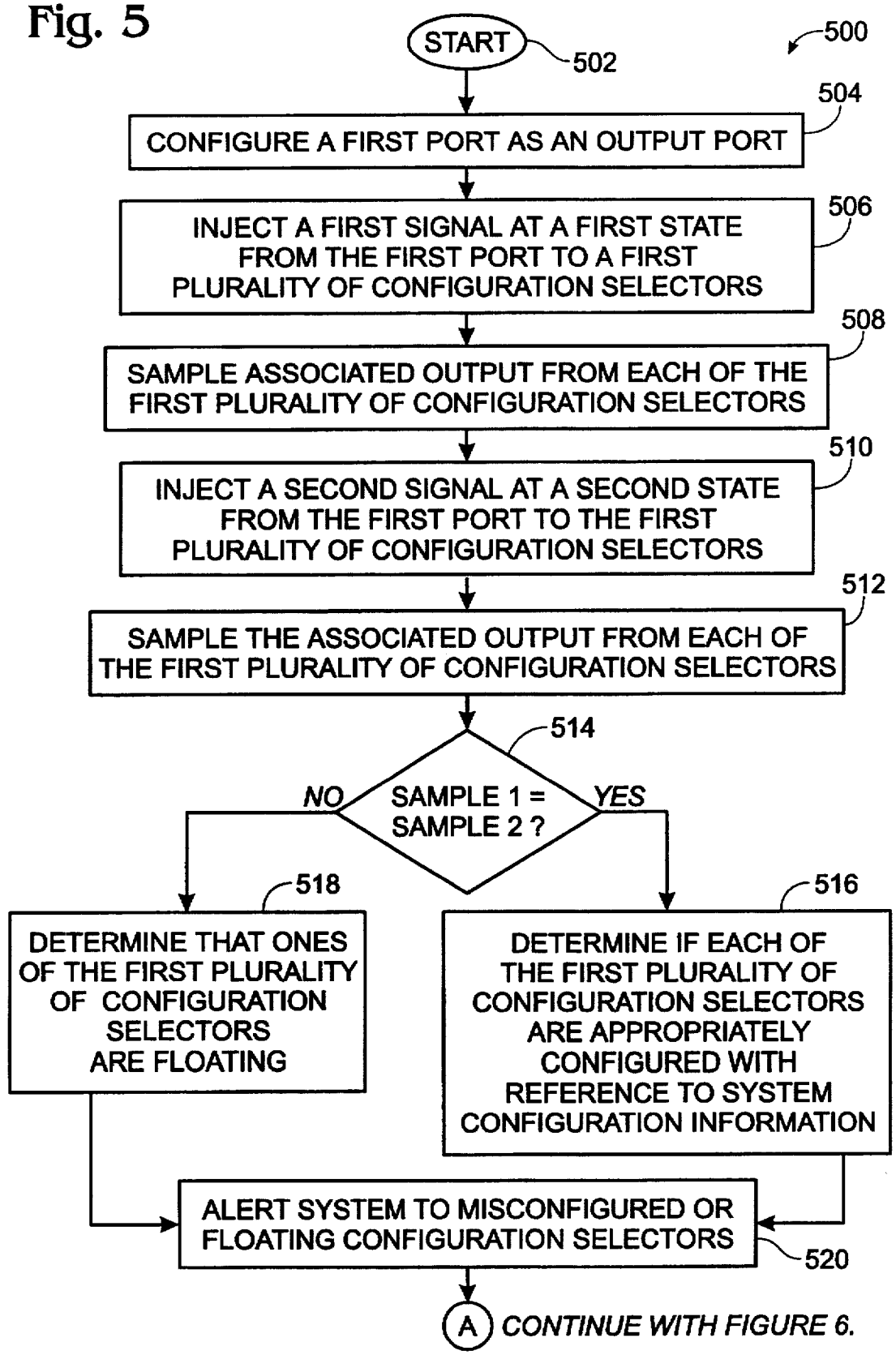
FIGS. 5 and 6 illustrate, in the form of a flow chart, an alternate method for determining the integrity and operating
Figure 6:
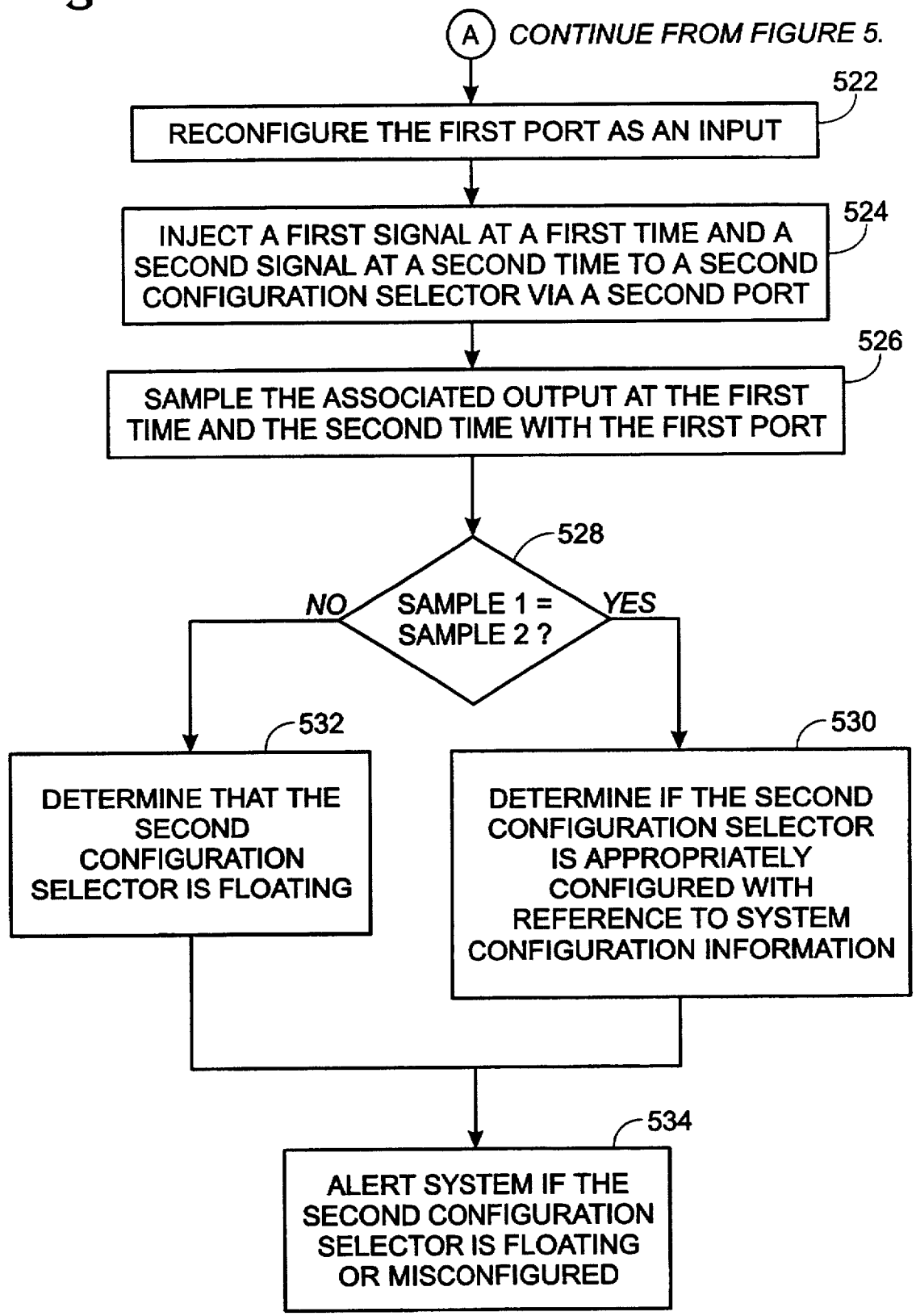

The operation of circuit 300 will be illustrated with continued reference to FIG. 3 in combination with the method illustrated in FIG. 5 and FIG. 6. The system begins, in step 502 with a request to verify the integrity and operating configuration of configuration selectors 42–45. In response, reconfigurable GPIO 302 is configured as a general purpose output port, while GPIO port 306 is configured as a general purpose input port, in step 504. In step 506, reconfigurable GPIO port 302 applies a first signal of a first state to configuration selector 44 through limiting resistors 314 and 318, and to configuration selector 45 through limiting resistor 312. In response to the applied first signal, the associated output of configuration selector 44 is sampled with reconfigurable GPIO port 306 through limiting resistor 318, and the associated output of configuration selector 45 is sampled with general purpose input port 308 in step 508. In step 510, signal at a second state to configuration selectors 44 and 45 through the appropriate limiting resistors, as described in step 506. Consequently, in step 512 the associated output of configuration selectors 44–45 is sampled with the corresponding appropriate GPIO ports 306 and 308, as described in step 508. In step 514, the associated output of the first sample is compared to the associated output of the second sample. For each of the individual configuration selectors 44–45, if the first sample and the second sample are substantially equal, each individual configuration selector is determined to be functional and the system references system configuration information to verify that each of the configuration selectors are appropriately configured, as depicted by step 516. Alternatively in step 518, where the first sample does not substantially equal the second sample of an individual configuration selector of configuration selectors 44–45, the configuration selector is determined to be floating. In step 520, if a configuration selector of configuration selectors 44–45 is determined to be floating or misconfigured, the system is alerted to such fact.

Next, to verify the integrity and operating configuration of configuration selector 42 and 43, reconfigurable GPIO port 302 is reconfigured as a general purpose input port, while reconfigurable GPIO port 306 is reconfigured as a general purpose output port, in step 522. In step 524, reconfigurable GPIO port 306 injects a third signal of a first state at a third time, and a fourth signal of a second state at a fourth time to configuration selector 42 through limiting resistors 314 and 310, and to configuration selector 43 through limiting resistor 318. In step 526, reconfigurable GPIO port 302 samples the associated output of configuration selector 42, and GPIO port 304 samples the associated output of configuration selector 43, at the corresponding third time and fourth time. In step 528, the samples are compared to determine if the first sample is substantially equal to the second sample. If so, the apparatus concludes that configuration selectors 42–43 are functional and further determines if it they are appropriately configured by comparing the associated output with the system configuration information, in step 530. Alternatively, in step 532, if the samples are not substantially equal, the system concludes that configuration selectors 42–43 are floating. Finally, in step 534, if it is determined that configuration selectors 42–43 are floating or misconfigured, the apparatus alerts the system to such fact.

Although the operation of circuit 300 has been described with particularity, one skilled in the art will appreciate from the teachings of circuit 300 that a number of different operational variations exist. As but one example, the order in which the first plurality of configuration selectors and the second plurality of configuration selectors are sampled is irrelevant to the novelty of the claimed invention. Thus, in the context of the example above, it is irrelevant whether configuration selectors 42 and 43 are tested after configuration selectors 44–45.

Thus, alternative embodiments for a method and apparatus for the non-invasive testing of a printed circuit board assembly have been described. While the method and apparatus of the present invention has been described in terms of the above illustrated embodiments, those skilled in the art will recognize that the invention is not limited to the embodiments described. For example, although the circuits of FIGS. 2 and 3 were described in the context of use on a printed circuit board assembly, either could readily be adaptable for use in a test system application, wherein a common controller tests a plurality of printed circuit boards via a common communication bus coupled therebetween.

Similarly, it is envisioned that the method illustrated in FIG. 4 or FIG. 5 could be incorporated into the system start-up (i.e. boot) process controlled by the system BIOS or, alternatively, incorporated into a third-party software utility used to verify the integrity and operating configuration of a printed circuit board assembly. Thus, the present invention can be practiced with modification and alteration within the spirit and scope of the appended claims. Accordingly, the descriptions thereof are to be regarded as illustrative instead of restrictive on the present invention.

What is claimed is:

1. An apparatus comprising:
   a plurality of configuration selectors selectively configurable into a plurality of configuration positions, each one of the plurality of configuration positions having an associated output signal;
   a first plurality of traces, correspondingly coupled to the plurality of configuration selectors;
   a first plurality of ports coupled to the first plurality of traces, and adapted to place electrical signals of a first state at a first time and a second state at a second time on the first plurality of traces; and
   a second plurality of traces, correspondingly coupled to the first plurality of traces, for receiving the associated output signal at each of the first time and second time from each of the plurality of configuration selectors, wherein the apparatus is operative to identify misconfigured or malfunctioning ones of the plurality of configuration selectors based, at least in part, on the associated output of each of the plurality of configuration selectors.

2. The apparatus of claim 1, further comprising a second plurality of ports corresponding to the second plurality of traces, for sampling the associated output at the first time and the second time from each of the corresponding plurality of configuration selectors.

3. The apparatus of claim 2, wherein the electrical signals of a first state and a second state are weak, non-invasive electrical signals.

4. The apparatus of claim 3, wherein the integrity of each configuration selector of the plurality of configuration selectors is determined by analyzing the first sampled associated output and second sampled associated output, wherein a constant associated output signifies a functional configuration selector, while a variable associated output signifies a floating configuration selector.

5. The apparatus of claim 4, wherein operating configuration of each functional configuration selector of the plurality of configuration selectors is determined by comparing the associated output against system configuration information.

6. The apparatus of claim 1, wherein each of the plurality of configuration selectors are a corresponding plurality of jumper assemblies.

7. The apparatus of claim 2, wherein the first plurality of ports are general purpose input and output ports configured as output ports at a first time and reconfigured as inputs at a second time, while the second plurality of ports are general purpose input ports.

8. The apparatus of claim 1, wherein the integrity of each of the configuration selectors from the plurality of configuration selectors is determined by analyzing the associated output received on each of the second traces from the second plurality of traces, wherein a constant associated output signifies a functional configuration selector, while a variable associated output signifies a floating configuration selector.

9. The apparatus of claim 8, wherein operating configuration of each functional configuration selector of the plurality of configuration selectors is determined by comparing the associated output against system configuration information.

10. The apparatus of claim 1, wherein the electrical signals of a first state and a second state are weak, non-invasive electrical signals.

11. The apparatus of claim 1, wherein the plurality of configuration selectors are a corresponding plurality of dual inline package (DIP) switches.

12. The apparatus of claim 1, wherein the first plurality of ports are reconfigurable general purpose input and output ports configured as general purpose outputs at a first time, and reconfigured as general purpose inputs at a second time.

13. A printed circuit board assembly including a plurality of configuration selectors selectively configurable into a plurality of configuration positions, each one of the plurality of configuration positions having an associated output, the printed circuit board assembly comprising:
    a processor;
    a first plurality of traces, correspondingly coupled to the plurality of configuration selectors;
    a first plurality of ports, coupled to the first plurality of traces and the processor, the processor operative to place thereon electrical signals of a first state at a first time and a second state at a second time; and
    a second plurality of traces, correspondingly coupled to the first plurality of traces and the processor, for receiving the associated output at the first time and the second time from the plurality of configuration selectors, wherein the processor is operative to identify misconfigured or malfunction ones of the plurality of configuration selectors based, at least in part on the associated output of each of the plurality of configuration selectors.

14. The printed circuit board assembly of claim 13, further comprising a second plurality of ports corresponding to the second plurality of traces, for sampling the associated output at the first time and the second time from each configuration selector from the corresponding plurality of configuration selectors.

15. The printed circuit board assembly of claim 14, wherein the electrical signals of a first state and a second state are weak, non-invasive electrical signals.

16. The printed circuit board assembly of claim 15, wherein the integrity of each configuration selector of the plurality of configuration selectors is determined by analyzing the sampled associated output such that a constant associated output from the first time to the second time indicates a functional configuration selector, while a difference between the first sampled associated output and the second sampled associated output signifies a floating configuration selector.

17. The printed circuit board assembly of claim 16, wherein the operating configuration of each functional configuration selector of the plurality of configuration selectors is determined by comparing the associated output to system configuration information.

18. The printed circuit board assembly of claim 14, wherein the first plurality of ports are reconfigurable general purpose input and output ports configured at a first time as output ports and reconfigured at a second time as input ports, while the second plurality of ports are general purpose input ports.

19. The printed circuit board assembly of claim 13, wherein configuration selector integrity of each configuration selector of the plurality of configuration selectors is determined by comparing the first sampled associated output with the second sampled associated output, wherein a constant output is indicative of a functional configuration selector and a variable associated output is indicative of a floating configuration selector.

20. The printed circuit board assembly of claim 19, wherein the configuration position of each functional configuration selector of the plurality of configuration selectors is determined by comparing the associated output with system configuration information.

21. A computer system having a printed circuit board constituted with a plurality of configuration selectors, each configuration selector selectively configurable into a plurality of configuration positions, each of the configuration positions having an associated output, the computer system comprising:
- a first plurality of traces, correspondingly coupled to the plurality of configuration selectors;
- a first plurality of ports, coupled to the first plurality of traces, and placing thereon electrical signals of a first state at a first time and a second state at a second time;
- a second plurality of traces, correspondingly coupled to the first plurality of traces, for receiving the associated output of each configuration selector of the plurality of configuration selectors at the first time and the second time, wherein the computer system is operative to identify misconfigured or malfunctioning ones of the plurality of configuration selectors based, at least in part, on the associated output of each of the plurality of configuration selectors.

22. The computer system of claim 21, further comprising a second plurality of ports, correspondingly coupled to the second plurality of traces for sampling associated output at the first time and the second time from each configuration selector from the corresponding plurality of configuration selectors.

23. The computer system of claim 22, wherein configuration selector integrity of each configuration selector of the plurality of configuration selector is determined by comparing the first sampled associated output with the second sampled associated output, wherein a constant associated output is indicative of a functional configuration selector, while a variable associated output is indicative of a floating configuration selector.

24. The computer system of claim 23, wherein the operating configuration of each functional configuration selector of the plurality of configuration selectors is verified by comparing the sampled associated output with system configuration information.

25. A method for testing a printed circuit board assembly having a plurality of configuration selectors, a first and second plurality of ports, and a plurality of traces correspondingly coupled between the configuration selectors and the ports, wherein the configuration selectors are selectively configurable into a plurality of configuration positions, each of the plurality of configuration positions having an associated output, the method comprising the steps of:
- injecting a first signal of a first state at a first time and a second signal of a second state at a second time, from the first plurality of ports into each of the plurality of configuration selectors;
- sampling the associated output of each of the plurality of configuration selectors at the first time and the second time with the second plurality of ports; and
- determining configuration selector integrity and the configuration position of each of the plurality of configuration selectors based, at least in part, on the sampled associated output at the first time and the sampled associated output at the second time from each of the plurality of configuration selectors.

26. The method of claim 25, wherein the step of determining comprises comparing the first sampled associated output and the second sampled associated output for each configuration selector of the plurality of configuration selectors, wherein a constant associated output is indicative of a functional configuration selector, while a variable associated output is indicative of a floating configuration selector, and the operating configuration of each functional configuration selector of the plurality of configuration selectors is verified by comparing the associated output of each functional configuration selector with system configuration information.

27. In a computer system having a printed circuit board assembly including a first and second plurality of configuration selectors, a first and second plurality of reconfigurable ports, and a plurality of traces corresponding to the configuration selectors, a computer implemented method for identifying configuration selector integrity and configuration position of each of the plurality of configuration selectors on the printed circuit board assembly comprising the steps of:
- configuring the first plurality of ports as input ports and the second plurality of ports as output ports;
- injecting a first signal of a first state at a first time and a second signal of a second state at a second time into the second plurality of configuration selectors from the first plurality of ports;
- sampling the associated output for each of the second plurality of configuration selectors at the first time and the second time through the second plurality of ports;
- determining the configuration selector integrity and identifying the configuration position of each of the second plurality of configuration selectors based, at least in part, on the associated output from each of the second plurality of configuration selectors; and
- reconfiguring the first plurality of ports as output ports and the second plurality of ports as input ports to determine the configuration selector integrity and identify the configuration position of each of the first plurality of configuration selectors.

28. The computer implemented method of claim 27, further comprising the steps of:
- injecting a third signal of the first state at a third time, and a fourth signal of the second state at a fourth time into each of the first plurality of configuration selectors from the second plurality of ports;
- sampling the associated output of each of the first plurality of configuration selectors at the third time and the fourth time through the first plurality of ports; and
- determining the configuration selector integrity and identifying the configuration position of each of the first plurality of configuration selectors based, at least in part, on the associated output of each of the first plurality of configuration selectors.

29. The computer implemented method of claim 28, wherein the steps of injecting, sampling and determining are implemented as a plurality of system basic input/output services (BIOS) of the computer system.

30. An apparatus comprising:
- a configuration selector selectively configurable into a plurality of configuration positions, each one of the plurality of configuration positions having an associated output signal;
- a first trace coupled to the configuration selector;

a first port coupled to the first trace, and adapted to place electrical signals of a first state at a first time and a second state at a second time on the first trace; and a second trace coupled to the first trace, for receiving the associated output signal from the configuration selector at each of the first time and second time, wherein the apparatus is operative to identify misconfigured or malfunctioning ones of the plurality of configuration selectors based, at least in part, on the associated output signal of the first time and the second time.

* * * * *